United States Patent
Myers, Jr. et al.

(10) Patent No.: US 8,001,761 B2
(45) Date of Patent: Aug. 23, 2011

(54) METHOD AND APPARATUS FOR ACTIVELY CONTROLLING FUEL FLOW TO A MIXER ASSEMBLY OF A GAS TURBINE ENGINE COMBUSTOR

(75) Inventors: William Joseph Myers, Jr., West Chester, OH (US); Alfred Albert Mancini, Cincinnati, OH (US); George Chia-Chun Hsiao, West Chester, OH (US); Shui-Chi Li, West Chester, OH (US); Shih-Yang Hsieh, West Chester, OH (US); Hukam Chand Mongia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 906 days.

(21) Appl. No.: 11/439,321

(22) Filed: May 23, 2006

(65) Prior Publication Data

US 2007/0271927 A1 Nov. 29, 2007

(51) Int. Cl.
*F02C 9/00* (2006.01)
*F02C 1/00* (2006.01)

(52) U.S. Cl. ...................... 60/39.281; 60/737
(58) Field of Classification Search ............... 60/39.281, 60/737, 746, 747
See application file for complete search history.

(56) References Cited

U.S. PATENT DOCUMENTS

| | | | |
|---|---|---|---|
| 6,354,072 B1 | 3/2002 | Hura | |
| 6,363,726 B1 | 4/2002 | Durbin et al. | |
| 6,367,262 B1 | 4/2002 | Mongia et al. | |
| 6,381,964 B1 | 5/2002 | Pritchard, Jr. et al. | |
| 6,389,815 B1 | 5/2002 | Hura et al. | |
| 6,405,523 B1 | 6/2002 | Foust et al. | |
| 6,418,726 B1 | 7/2002 | Foust et al. | |
| 6,453,660 B1 | 9/2002 | Johnson et al. | |
| 6,484,489 B1 | 11/2002 | Foust et al. | |
| 6,523,350 B1 | 2/2003 | Mancini et al. | |
| 6,718,770 B2 | 4/2004 | Laing et al. | |
| 6,742,341 B2 * | 6/2004 | Ryan et al. ................ | 60/773 |

(Continued)

FOREIGN PATENT DOCUMENTS

| | | |
|---|---|---|
| GB | 0714583.2 | 1/2009 |
| JP | 2004316506 | * 11/2004 |

*Primary Examiner* — Michael Cuff
*Assistant Examiner* — Gerald L Sung
(74) *Attorney, Agent, or Firm* — General Electric Company; William Scott Andes; Marcella R. Louke

(57) ABSTRACT

An apparatus for actively controlling fuel flow from a fuel pump to a mixer assembly of a gas turbine engine combustor, where the mixer assembly includes a pilot mixer and a main mixer. The pilot mixer further includes an annular pilot housing having a hollow interior, a primary fuel injector mounted in the pilot housing and adapted for dispensing droplets of fuel to the hollow interior of the pilot housing, a plurality of axial swirlers positioned upstream from the primary fuel injector. The fuel flow control apparatus further includes: at least one sensor for detecting dynamic pressure in the combustor; a fuel nozzle; and, a system for controlling fuel flow supplied by the fuel nozzle through the valves. The fuel nozzle includes: a feed strip with a plurality of circuits for providing fuel to the pilot mixer and the main mixer; and, a plurality of valves associated with the fuel nozzle and in flow communication with the feed strip thereof. The control system activates the valves in accordance with signals received from the pressure sensor.

35 Claims, 8 Drawing Sheets

U.S. PATENT DOCUMENTS

| | | |
|---|---|---|
| 6,865,889 B2 | 3/2005 | Mancini et al. |
| 6,955,040 B1 | 10/2005 | Myers, Jr. et al. |
| 2002/0129606 A1* | 9/2002 | Wrubel et al. .................. 60/740 |
| 2004/0255594 A1* | 12/2004 | Baino et al. ..................... 60/773 |

* cited by examiner

METHOD AND APPARATUS FOR ACTIVELY CONTROLLING FUEL FLOW TO A MIXER ASSEMBLY OF A GAS TURBINE ENGINE COMBUSTOR

BACKGROUND OF THE INVENTION

The present invention relates to a staged combustion system in which the production of undesirable combustion product components is minimized over the engine operating regime and, more particularly, to a method and apparatus for actively controlling fuel flow to a mixer assembly having a pilot mixer with a primary fuel injector and secondary fuel injection ports.

Modern day emphasis on minimizing the production and discharge of gases that contribute to smog and to other undesirable environmental conditions, particularly those gases that are emitted from internal combustion engines, have led to different gas turbine engine combustor designs that have been developed in an effort to reduce the production and discharge of such undesirable combustion product components. Other factors that influence combustor design are the desires of users of gas turbine engines for efficient, low cost operation, which translates into a need for reduced fuel consumption while at the same time maintaining or even increasing engine output. As a consequence, important design criteria for aircraft gas turbine engine combustion systems include provision for high combustion temperatures, in order to provide high thermal efficiency under a variety of engine operating conditions, as well as the minimization of undesirable combustion conditions that contribute to the emission of particulates, and to the emission of undesirable gases, and to the emission of combustion products that are precursors to the formation of photochemical smog.

Various governmental regulatory bodies have established emission limits for acceptable levels of unburned hydrocarbons (HC), carbon monoxide (CO), and oxides of nitrogen (NOx), which have been identified as the primary contributors to the generation of undesirable atmospheric conditions. Therefore, different combustor designs have been developed to meet those criteria For example, one way in which the problem of minimizing the emission of undesirable gas turbine engine combustion products has been attacked is the provision of staged combustion. In that arrangement, a combustor is provided in which a first stage burner is utilized for low speed and low power conditions to more closely control the character of the combustion products. A combination of first stage and second stage burners is provided for higher power outlet conditions while attempting to maintain the combustion products within the emissions limits. It will be appreciated that balancing the operation of the first and second stage burners to allow efficient thermal operation of the engine, while simultaneously minimizing the production of undesirable combustion products, is difficult to achieve. In that regard, operating at low combustion temperatures to lower the emissions of NOx, can also result in incomplete or partially incomplete combustion, which can lead to the production of excessive amounts of HC and CO, in addition to producing lower power output and lower thermal efficiency. High combustion temperature, on the other hand, although improving thermal efficiency and lowering the amount of HC and CO, often results in a higher output of NOx.

Another way that has been proposed to minimize the production of those undesirable combustion product components is to provide for more effective intermixing of the injected fuel and the combustion air. In that regard, numerous mixer designs have been proposed over the years to improve the mixing of the fuel and air. In this way, burning occurs uniformly over the entire mixture and reduces the level of HC and CO that result from incomplete combustion. Even with improved mixing, however, higher levels of undesirable NOx are formed under high power conditions when the flame temperatures are high.

One mixer design that has been utilized is known as a twin annular premixing swirler (TAPS), which is disclosed in the following U.S. Pat. Nos. 6,354,072; 6,363,726; 6,367,262; 6,381,964; 6,389,815; 6,418,726; 6,453,660; 6,484,489; and, 6,865,889. It will be understood that the TAPS mixer assembly includes a pilot mixer which is supplied with fuel during the entire engine operating cycle and a main mixer which is supplied with fuel only during increased power conditions of the engine operating cycle. While improvements in the main mixer of the assembly during high power conditions (i.e., take-off and climb) are disclosed in patent applications having Ser. Nos. 11/188,596, 11/188,598, and 11/188,470, modification of the pilot mixer is desired to improve operability across other portions of the engine's operating envelope (i.e., idle, approach and cruise) while maintaining combustion efficiency.

In order to provide increased functionality and flexibility, the pilot mixer in a TAPS type mixer assembly has been developed and is disclosed in a patent application entitled "Pilot Mixer For Mixer Assembly Of A Gas Turbine Engine Combustor Having A Primary Fuel Injector And A Plurality Of Secondary Fuel Injection Ports." This patent application, having Ser. No. 11/365,428, is owned by the assignee of the present application and hereby incorporated by reference. While the 428 application is concerned with the physical embodiments of the pilot mixer, it will be appreciated that an apparatus and method is desired which is able to actively control fuel flow to such pilot mixer, as well as the overall mixer assembly containing it.

It is well known that lean, premix combustion requires operation close to the lean-blow out boundary in order to minimize emissions. Therefore, it is desired that the onset of a lean blow out event be recognized so that operation of the combustor can be adjusted and lean blow out avoided. In addition, the mixing of air and fuel must be extremely effective to achieve low emissions. To enhance such mixing, pulsing the fuel to the injectors at a high frequency would also be desirable.

It has also been found that lean, premix combustion often results in high dynamic pressure levels in the combustor. The combustion dynamics is a result of interaction between heat release from combusting the fuel-air mixture and pressure oscillations in the chamber. Such dynamic pressures may result in high cycle fatigue and can damage combustor parts. While the effects of dynamic pressures on the combustor have been countered previously, this has generally involved the provision of high bandwidth fuel or air actuation to reduce the pressure levels associated with acoustic modes of the combustor.

Thus, there is a need to provide a gas turbine engine combustor in which the production of undesirable combustion product components is minimized over a wide range of engine operating conditions. Accordingly, it is desired that the pilot mixer of a nested combustor arrangement be modified to include a primary fuel injector and a plurality of secondary fuel injection ports. It is also desired that an active control system and process be provided which enhances operation of such mixer assembly by identifying and countering the onset of a lean blow out condition, as well as an unacceptable level of dynamic pressure experienced in the combustor.

BRIEF SUMMARY OF THE INVENTION

In a first exemplary embodiment of the invention, an apparatus for actively controlling fuel flow from a fuel pump to a mixer assembly of a gas turbine engine combustor is disclosed, where the mixer assembly includes a pilot mixer and a main mixer. The pilot mixer further includes an annular pilot housing having a hollow interior, a primary fuel injector mounted in the pilot housing and adapted for dispensing droplets of fuel to the hollow interior of the pilot housing, and a plurality of axial swirlers positioned upstream from the primary fuel injector. The fuel flow control apparatus further includes: at least one sensor for detecting dynamic pressure in the combustor; a fuel nozzle; and, a system for actively controlling fuel flow supplied to the pilot mixer and the main mixer of the mixer assembly by the fuel nozzle. The fuel nozzle further includes: a feed strip with a plurality of circuits for providing fuel to the pilot mixer and the main mixer; and, a plurality of valves associated with the fuel nozzle and in flow communication with the feed strip thereof. The control system activates the valves in accordance with signals received from the pressure sensor.

In a second exemplary embodiment of the invention, an apparatus for actively controlling fuel flow from a fuel pump to a mixer assembly of a gas turbine engine combustor is disclosed, where the mixer assembly includes a pilot mixer and a main mixer. The pilot mixer further includes an annular pilot housing having a hollow interior, a primary fuel injector mounted in the pilot housing and adapted for dispensing droplets of fuel to the hollow interior of the pilot housing, a plurality of axial swirlers positioned upstream from the primary fuel injector, and a plurality of secondary fuel injection ports for introducing fuel into the hollow interior of the pilot housing. The fuel flow control apparatus further includes: at least one sensor for detecting dynamic pressure in the combustor; a fuel nozzle; and, a system for actively controlling fuel flow supplied to the pilot mixer and the main mixer of the mixer assembly by the fuel nozzle. The fuel nozzle further includes: a feed strip with a plurality of circuits for providing fuel to the primary fuel injector of the pilot mixer, the secondary fuel injection ports of the pilot mixer, and the main mixer; and, a plurality of valves associated with the fuel nozzle and in flow communication with the feed strip thereof. The control system activates the valves in accordance with signals received from the pressure sensor.

In a third exemplary embodiment of the invention, a method of actively controlling fuel flow from a fuel pump to a mixer assembly of a gas turbine engine combustor is disclosed, the mixer assembly including a pilot mixer and a main mixer, wherein the pilot mixer further includes an annular pilot housing having a hollow interior and a primary fuel injector mounted in the pilot housing and adapted for dispensing droplets of fuel to the hollow interior of the pilot housing. The method includes the following steps: continuously sensing dynamic pressure in a combustion chamber of the combustor, determining whether an amplitude of the sensed dynamic pressure in the combustion chamber is greater than a predetermined amount; and, signaling a fuel nozzle to provide fuel in a specified manner to the pilot mixer when the pressure amplitude is greater than the predetermined amount.

In a fourth exemplary embodiment of the invention, a method of actively controlling fuel flow from a fuel pump to a mixer assembly of a gas turbine engine combustor is disclosed, the mixer assembly including a pilot mixer and a main mixer, wherein the pilot mixer further includes an annular pilot housing having a hollow interior, a primary fuel injector mounted in the pilot housing and adapted for dispensing droplets of fuel to the hollow interior of the pilot housing, and a plurality of secondary fuel injection ports for introducing fuel into the hollow interior of the pilot housing. The method includes the following steps: continuously sensing dynamic pressure in a combustion chamber of the combustor; determining whether an amplitude of the sensed dynamic pressure in the combustion chamber is greater than a predetermined amount; and, signaling a fuel nozzle to provide fuel in a specified manner to the secondary fuel injection ports of the pilot mixer when the pressure amplitude is greater than the predetermined amount.

In a fifth exemplary embodiment of the invention, a method of actively controlling fuel flow from a fuel pump to a mixer assembly of a gas turbine engine combustor is disclosed, the mixer assembly including a pilot mixer and a main mixer, wherein the pilot mixer further includes an annular pilot housing having a hollow interior and a primary fuel injector mounted in the pilot housing and adapted for dispensing droplets of fuel to the hollow interior of the pilot housing. The method includes the following steps: continuously sensing dynamic pressure in a combustion chamber of the combustor; determining whether a frequency of the sensed dynamic pressure in the combustion chamber is within a predetermined range; and, signaling a fuel nozzle to provide fuel in a specified manner to the pilot mixer when the pressure frequency is within the predetermined range.

In a sixth exemplary embodiment of the invention, a method of actively controlling fuel flow from a fuel pump to a mixer assembly of a gas turbine engine combustor is disclosed, the mixer assembly including a pilot mixer and a main mixer, wherein the pilot mixer further includes an annular pilot housing having a hollow interior, a primary fuel injector mounted in the pilot housing and adapted for dispensing droplets of fuel to the hollow interior of the pilot housing, and a plurality of secondary fuel injection ports for introducing fuel into the hollow interior of the pilot housing. The method includes the following steps: continuously sensing dynamic pressure in a combustion chamber of the combustor; determining whether a frequency of the sensed dynamic pressure in the combustion chamber is within a predetermined range; and, signaling a fuel nozzle to provide fuel in a specified manner to the secondary fuel injection ports of the pilot mixer when the pressure frequency is within the predetermined range.

In a seventh exemplary embodiment of the invention, a method of actively controlling fuel flow from a fuel pump to a mixer assembly of a gas turbine engine combustor during a plurality of operational stages is disclosed, the mixer assembly including a pilot mixer and a main mixer, wherein the pilot mixer further includes an annular pilot housing having a hollow interior, a primary fuel injector mounted in the pilot housing and adapted for dispensing droplets of fuel to the hollow interior of the pilot housing, and a plurality of secondary fuel injection ports for introducing fuel into the hollow interior of the pilot housing. The method includes the following steps: supplying fuel only to the primary fuel injector and the secondary fuel injection ports of the pilot mixer during a first fueling mode; supplying fuel to the pilot mixer and the main mixer in a first specified amount during a second fueling mode; and, supplying fuel to the plot mixer and the main mixer in a second specified amount during a third fueling mode.

DETAILED DESCRIPTION OF THE INVENTION

Figure 1:
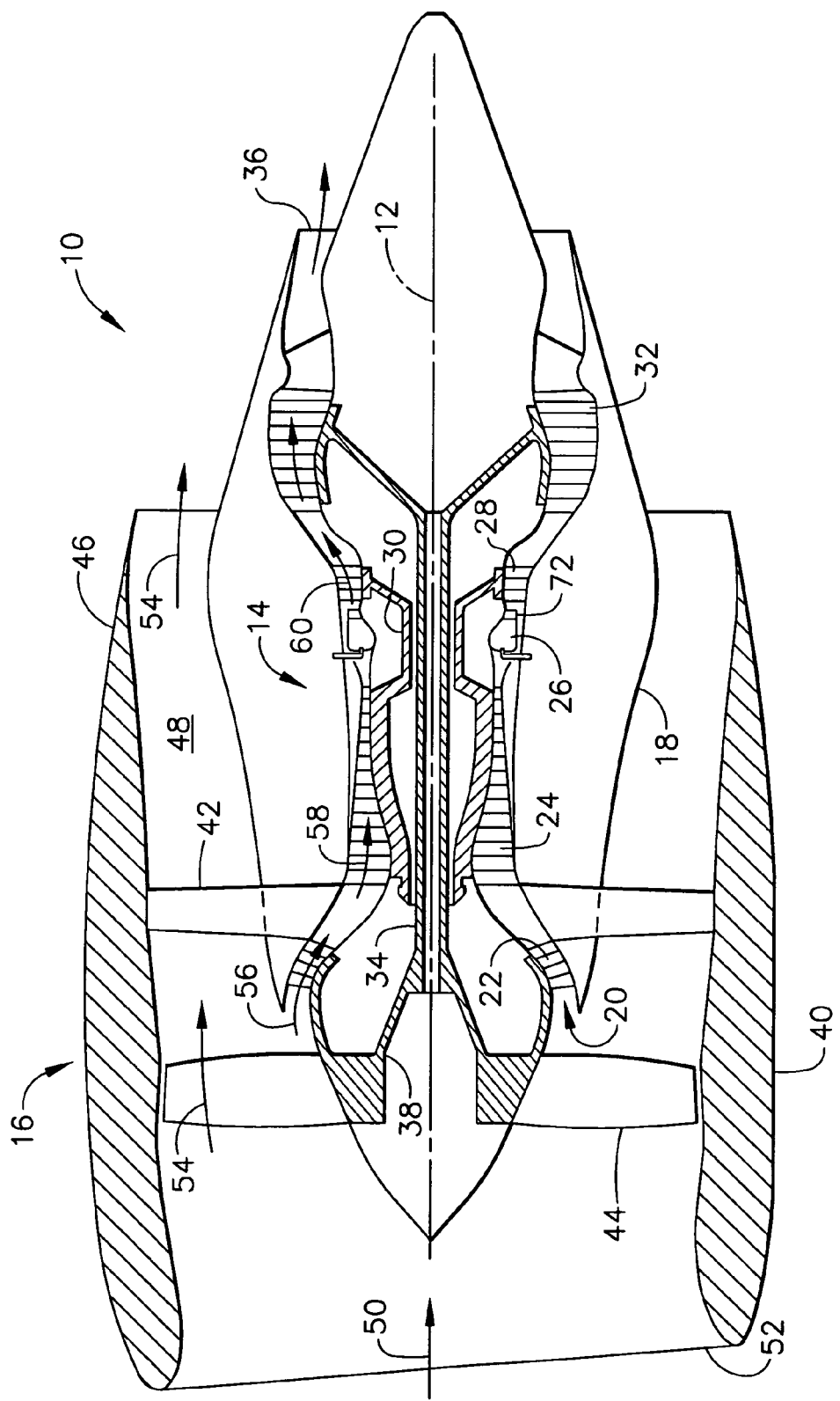
FIG. 1 is a diagrammatic view of a high bypass turbofan gas turbine engine.

Referring now to the drawings in detail, wherein identical numerals indicate the same elements throughout the figures, FIG. 1 depicts in diagrammatic form an exemplary gas turbine engine 10 (high bypass type) utilized with aircraft having a longitudinal or axial centerline axis 12 therethrough for reference purposes. Engine 10 preferably includes a core gas turbine engine generally identified by numeral 14 and a fan section 16 positioned upstream thereof. Core engine 14 typically includes a generally tubular outer casing 18 that defines an annular inlet 20. Outer casing 18 further encloses and supports a booster compressor 22 for raising the pressure of the air that enters core engine 14 to a first pressure level. A high pressure, multi-stage, axial-flow compressor 24 receives pressurized air from booster 22 and further increases the pressure of the air. The pressurized air flows to a combustor 26, where fuel is injected into the pressurized air stream to raise the temperature and energy level of the pressurized air. The high energy combustion products flow from combustor 26 to a first (high pressure) turbine 28 for driving high pressure compressor 24 through a first (high pressure) drive shaft 30, and then to a second (low pressure) turbine 32 for driving booster compressor 22 and fan section 16 through a second (low pressure) drive shaft 34 that is coaxial with first drive shaft 30. After driving each of turbines 28 and 32, the combustion products leave core engine 14 through an exhaust nozzle 36 to provide propulsive jet thrust.

Fan section 16 includes a rotatable, axial-flow fan rotor 38 that is surrounded by an annular fan casing 40. It will be appreciated that fan casing 40 is supported from core engine 14 by a plurality of substantially radially-extending, circumferentially-spaced outlet guide vanes 42. In this way, fan casing 40 encloses fan rotor 38 and fan rotor blades 44. Downstream section 46 of fan casing 40 extends over an outer portion of core engine 14 to define a secondary, or bypass, airflow conduit 48 that provides additional propulsive jet thrust.

From a flow standpoint, it will be appreciated that an initial air flow, represented by arrow 50, enters gas turbine engine 10 through an inlet 52 to fan casing 40. Air flow 50 passes through fan blades 44 and splits into a first compressed air flow (represented by arrow 54) that moves through conduit 48 and a second compressed air flow (represented by arrow 56) which enters booster compressor 22. The pressure of second compressed air flow 56 is increased and enters high pressure compressor 24, as represented by arrow 58. After mixing with fuel and being combusted in combustor 26, combustion products 60 exit combustor 26 and flow through first turbine 28. Combustion products 60 then flow through second turbine 32 and exit exhaust nozzle 36 to provide thrust for gas turbine engine 10.

Figure 2:
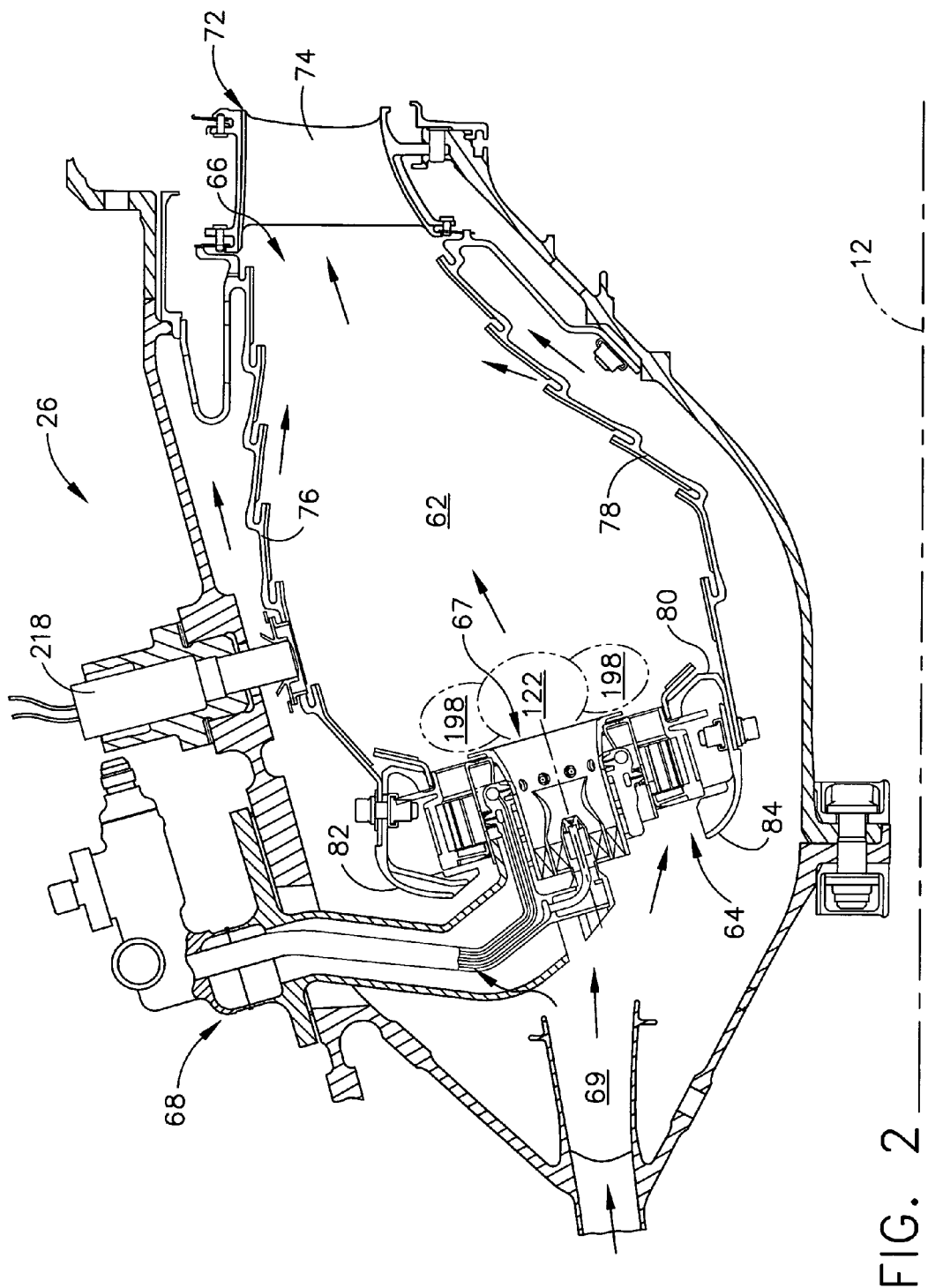
FIG. 2 is a longitudinal, cross-sectional view of a gas turbine engine combustor having a staged arrangement.

As best seen in FIG. 2, combustor 26 includes an annular combustion chamber 62 that is coaxial with longitudinal axis 12, as well as an inlet 64 and an outlet 66. As noted above, combustor 26 receives an annular stream of pressurized air from a high pressure compressor discharge outlet 69. A portion of this compressor discharge air flows into a mixing assembly 67, where fuel is also injected from a fuel nozzle 68 to mix with the air and form a fuel-air mixture that is provided to combustion chamber 62 for combustion. Ignition of the fuel-air mixture is accomplished by a suitable igniter (not shown), and the resulting combustion gases 60 flow in an axial direction toward and into an annular, first stage turbine nozzle 72. Nozzle 72 is defined by an annular flow channel that includes a plurality of radially-extending, circularly-spaced nozzle vanes 74 that turn the gases so that they flow angularly and impinge upon the first stage turbine blades of first turbine 28. As shown in FIG. 1, first turbine 28 preferably rotates high pressure compressor 24 via first drive shaft 30. Low pressure turbine 32 preferably drives booster compressor 24 and fan rotor 38 via second drive shaft 34.

Combustion chamber 62 is housed within engine outer casing 18 and is defined by an annular combustor outer liner 76 and a radially-inwardly positioned annular combustor inner liner 78. The arrows in FIG. 2 show the directions in which compressor discharge air flows within combustor 26. As shown, part of the air flows over the outermost surface of outer liner 76, part flows into combustion chamber 62, and part flows over the innermost surface of inner liner 78.

Contrary to previous designs, it is preferred that outer and inner liners 76 and 78, respectively, not be provided with a plurality of dilution openings to allow additional air to enter combustion chamber 62 for completion of the combustion process before the combustion products enter turbine nozzle 72. This is in accordance with a patent application entitled "High Pressure Gas Turbine Engine Having Reduced Emissions" and having Ser. No. 11/188,483, which is also owned by the assignee of the present invention. It will be understood, however, that outer liner 76 and inner liner 78 preferably include a plurality of smaller, circularly-spaced cooling air apertures (not shown) for allowing some of the air that flows along the outermost surfaces thereof to flow into the interior of combustion chamber 62. Those inwardly-directed air flows pass along the inner surfaces of outer and inner liners 76 and 78 that face the interior of combustion chamber 62 so that a film of cooling air is provided therealong.

It will be understood that a plurality of axially-extending mixing assemblies 67 are disposed in a circular array at the upstream end of combustor 26 and extend into inlet 64 of annular combustion chamber 62. It will be seen that an annular dome plate 80 extends inwardly and forwardly to define an upstream end of combustion chamber 62 and has a plurality of circumferentially spaced openings formed therein for receiving mixing assemblies 67. For their part, upstream portions of each of inner and outer liners 76 and 78, respectively, are spaced from each other in a radial direction and define an outer cowl 82 and an inner cowl 84. The spacing between the forwardmost ends of outer and inner cowls 82 and 84 defines combustion chamber inlet 64 to provide an opening to allow compressor discharge air to enter combustion chamber 62.

Figure 3:
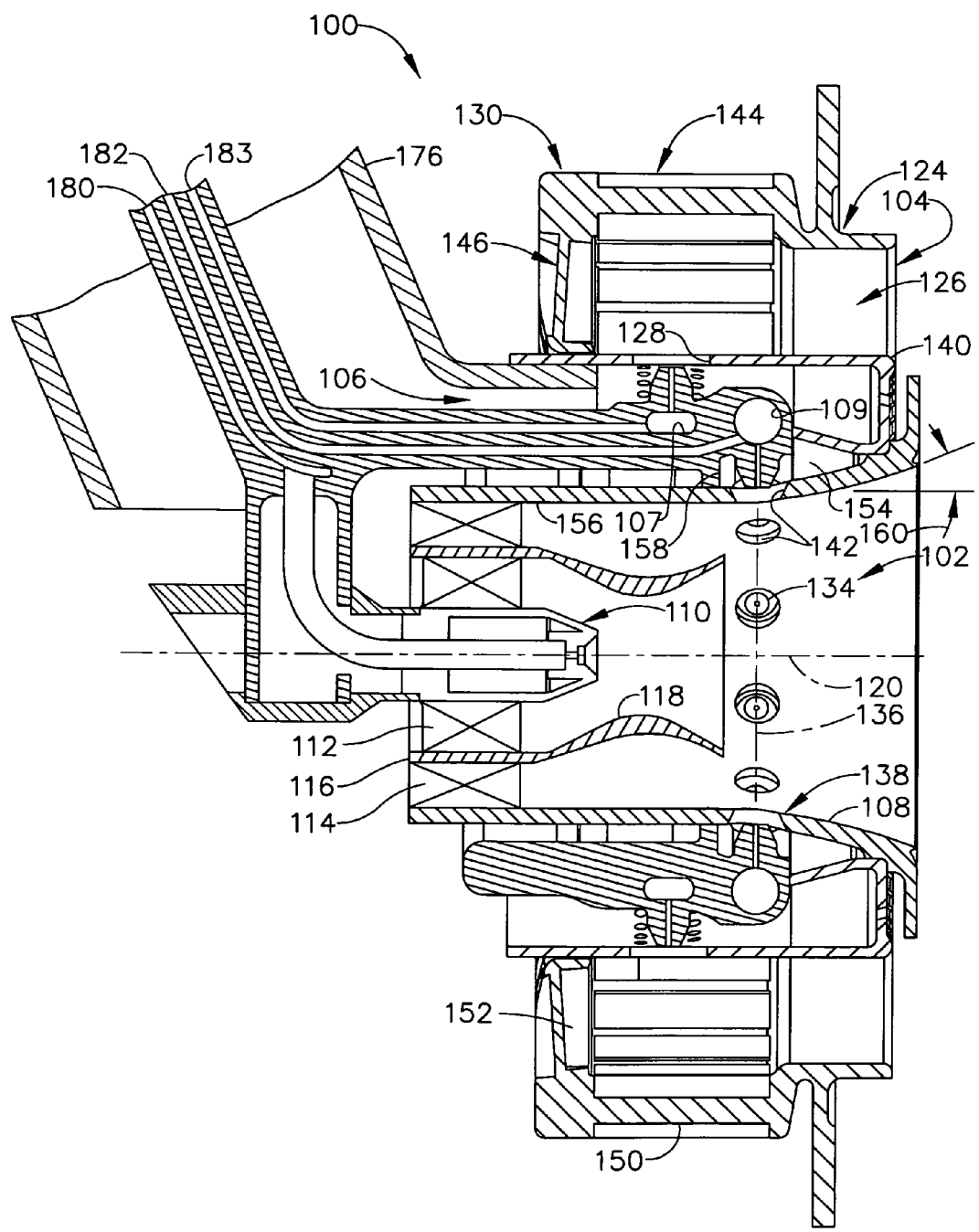
FIG. 3 is an enlarged, cross-sectional view of the mixer assembly depicted in FIG. 2.
Figure 4:
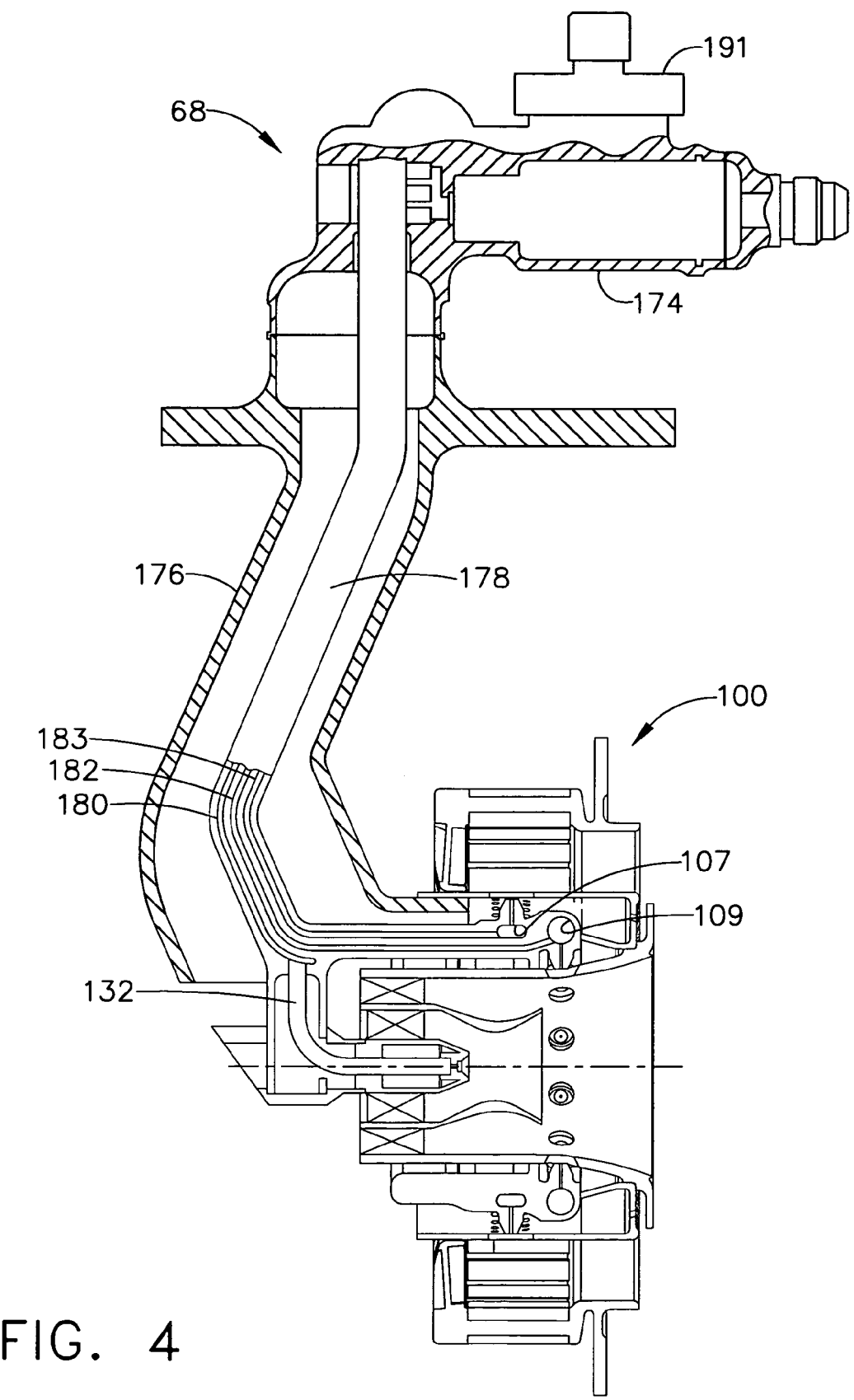
FIG. 4 is a cross-sectional view of a fuel nozzle assembly and the mixer assembly depicted in FIGS. 2 and 3.

A mixing assembly 100 in accordance with one embodiment of the present invention is shown in FIG. 3. Mixing assembly 100 preferably includes a pilot mixer 102, a main mixer 104, and a cavity 106 positioned therebetween. More specifically, it will be seen that pilot mixer 102 preferably includes an annular pilot housing 108 having a hollow interior, as well as a primary fuel injector 110 mounted in housing 108 and adapted for dispensing droplets of fuel to the hollow interior of pilot housing 108. Further, pilot mixer 102 preferably includes a first swirler 112 located at a radially inner position adjacent primary fuel injector 110, a second swirler 114 located at a radially outer position from first swirler 112, and a splitter 116 positioned therebetween. As shown, splitter 116 extends downstream of primary fuel injector 110 to form a venturi 118 at a downstream portion. It will be understood that first and second pilot swirlers 112 and 114 are generally oriented parallel to a centerline axis 120 through mixing assembly 100 and include a plurality of vanes for swirling air traveling therethrough. Fuel and air are provided to pilot mixer 102 at all times during the engine operating cycle so that a primary combustion zone 122 is produced within a central portion of combustion chamber 62 (see FIG. 2).

Main mixer 104 further includes an annular main housing 124 radially surrounding pilot housing 108 and defining an annular cavity 126, a plurality of fuel injection ports 128 which introduce fuel into annular cavity 126, and a swirler arrangement identified generally by numeral 130. Swirler arrangement 130 may be configured in any of several ways, as seen in a patent application entitled "Mixer Assembly For Combustor Of A Gas Turbine Engine Having A Plurality Of Counter-Rotating Swirlers" having Ser. No. 11/188,596 and a patent application entitled "Swirler Arrangement For Mixer Assembly Of A Gas Turbine Engine Combustor Having Shaped Passages" having Ser. No. 11/188,595, both of which are assigned to the owner of the present invention. It will be seen in FIG. 3, however, that swirler arrangement 130 preferably includes at least a first swirler 144 positioned upstream from fuel injection ports 128. As shown, first swirler 144 is preferably oriented substantial radially to centerline axis 120 through mixer assembly 100. It will be noted that first swirler 144 includes a plurality of vanes 150 for swirling the air flowing therebetween. Since vanes 150 are substantially uniformly spaced circumferentially, a plurality of substantially uniform passages are defined between adjacent vanes 150. It will further be understood that swirler 144 may include vanes having different configurations so as to shape the passages in a desirable manner, as disclosed in the '595 patent application identified hereinabove.

Swirler arrangement 130 also is shown as including a second swirler 146 positioned upstream from fuel injection ports 128 and preferably oriented substantially parallel to centerline axis 120. Second swirler 146 further includes a plurality of vanes 152 for swirling the air flowing therebetween. Although vanes 152 are shown as being substantially uniformly spaced circumferentially, thereby defining a plurality of substantially uniform passages therebetween, such vanes 152 may also have different configurations so as to shape the passages in a desirable manner.

Cavity 106, as stated above, is located between pilot mixer 102 and main mixer 104 and contains a first fuel manifold 107 in flow communication with a fuel supply. In particular, a centerbody outer shell 140 forms an outer surface and an aft surface of cavity 106, with pilot housing 108 providing an inner surface thereof. Fuel injection ports 128 are in flow communication with fuel manifold 107 and spaced circumferentially around centerbody outer shell 140. As seen in FIG. 3, fuel injection ports 128 are preferably positioned so that fuel is provided in an upstream end of annular cavity 126.

When fuel is provided to main mixer 104, an annular, secondary combustion zone 198 is provided in combustion chamber 62 that is radially outwardly spaced from and concentrically surrounds primary combustion zone 122. Depending upon the size of gas turbine engine 10, as many as twenty or so mixer assemblies 100 can be disposed in a circular array at inlet 64 of combustion chamber 62.

As seen in FIG. 3, pilot mixer 102 also preferably includes a plurality of spaced secondary fuel injection ports 134, whereby fuel is also introduced into hollow interior of pilot housing 108. It will be appreciated that secondary fuel injection ports 134 are preferably spaced circumferentially about pilot housing 108 within a designated plane 136 intersecting centerline axis 120 through mixing assembly 100. While plane 136, in which secondary fuel injection ports 134 lie, is shown as being located in a flared portion 138 of pilot housing 108 downstream of splitter 116, it will be understood that a plane containing such secondary fuel injection ports 134 may be located at approximately a downstream end of splitter 116 or even upstream thereof. Indeed, the axial length of splitter 116 may be altered so that its relationship with the location of secondary fuel injection ports 134 could change.

Similarly, plane 136 is depicted as being oriented substantially perpendicular to centerline axis 120, but secondary fuel injection ports 134 may be positioned so that plane 136 is skewed so as to be angled either upstream or downstream as desired. Further, regardless of the axial position or orientation of plane 136 containing secondary fuel injection ports 134, each such secondary fuel injection port 134 may individually be oriented substantially perpendicular to centerline axis 120, oriented upstream at an acute angle, or oriented-downstream at an obtuse angle.

It will further be seen that secondary fuel injection ports 134 of pilot mixer 102 preferably are in flow communication with a second fuel manifold 109, which also is preferably located within cavity 106. Fuel is typically injected into the hollow portion of pilot housing 108 by secondary fuel injection ports 134 upon the occurrence of a specified event (e.g., a designated cycle point for gas turbine engine 10, when compressor discharge air 58 is a designated temperature, etc.). Depending upon the requirements of a specific condition, fuel is injected through secondary fuel injection ports 134 at a rate greater than, less than or substantially the same as fuel injected through primary fuel injector 110. Of course, this presumes that fuel will be provided by primary fuel injector 110 at all times, but there may be occasions when it is preferable to provide fuel to pilot mixer 102 only through secondary fuel injection ports 134.

In this way, pilot mixer 102 has greater flexibility during operation across the lower power conditions (i.e., idle, approach and cruise). In particular, it will be appreciated that pilot mixer 102 is able to power gas turbine engine 10 up to approximately 30% of a maximum when fuel is provided solely to primary fuel injector 110. By comparison, pilot mixer 102 is able to power gas turbine engine 10 up to approximately 70% of maximum thrust when fuel is provided to secondary fuel injection ports 134 as well.

In order to promote the desired fuel spray into the hollow interior of pilot housing 108, it is preferred that a passage 142 surround each secondary fuel injection port 134 of pilot mixer 102. Each passage 142 is in flow communication with compressed air via a supply 154 provided in cavity 106. This air is provided to facilitate injection of the fuel spray into pilot housing 108 instead of being forced along an inner surface 156 thereof. This may further be enhanced by providing a swirler 158 within each passage 142 which provides a swirl to the air injected around the fuel spray.

It is also preferred that vanes of outer pilot swirler 114 be configured so that air passing therethrough is directed at least somewhat toward inner surface 156 of pilot housing 108. In this way, such air is better able to interact with fuel provided by secondary fuel injection ports 134. Accordingly, such vanes are preferably angled at approximately 30° to about 60° with respect to centerline axis 120. In this way, a flare angle 160 of pilot housing 108 is approximated.

Considering the addition of secondary fuel injection ports 134 in pilot mixer 102, it will be appreciated that the flow rate of air therethrough is preferably maintained at a rate of approximately 10% to approximately 30%. Further, such secondary injection ports 134 assist in reducing the emissions produced by mixer assembly 100 during the operation of gas turbine engine 10. In particular, combustor 26 is able to operate only with fuel being supplied to pilot mixer 102 for a greater time period. Also, it has been found that providing more fuel at a radially outer location of pilot mixer 102 is desirable.

It will further be seen in FIGS. 4-7 that an apparatus and method for controlling fuel flow to mixer assembly 100 is provided. With respect to fuel nozzle 68, it will be appreciated that it is configured similar to that shown and described in U.S. Pat. No. 6,955,040 to Myers, Jr. et al., which is hereby incorporated herein. More specifically, it will be seen that fuel nozzle 68 includes a housing 174 located at an outer radial location which contains a plurality of valves, a nozzle support 176 which extends between valve housing 174 and mixer assembly 100, and a macrolaminate feed strip 178 positioned within nozzle support 176. Feed strip 178 further includes a first circuit 180 for supplying fuel to a fuel tube 132 (which is in flow communication with primary fuel injector 110 of pilot mixer 102), a second circuit 182 for supplying fuel to fuel manifold 109 (which is in flow communication with secondary fuel injection ports 134 of pilot mixer 102), and a third circuit 183 for supplying fuel to fuel manifold 107 (which is in flow communication with fuel injection ports 128 of main mixer 104).

Figure 5:
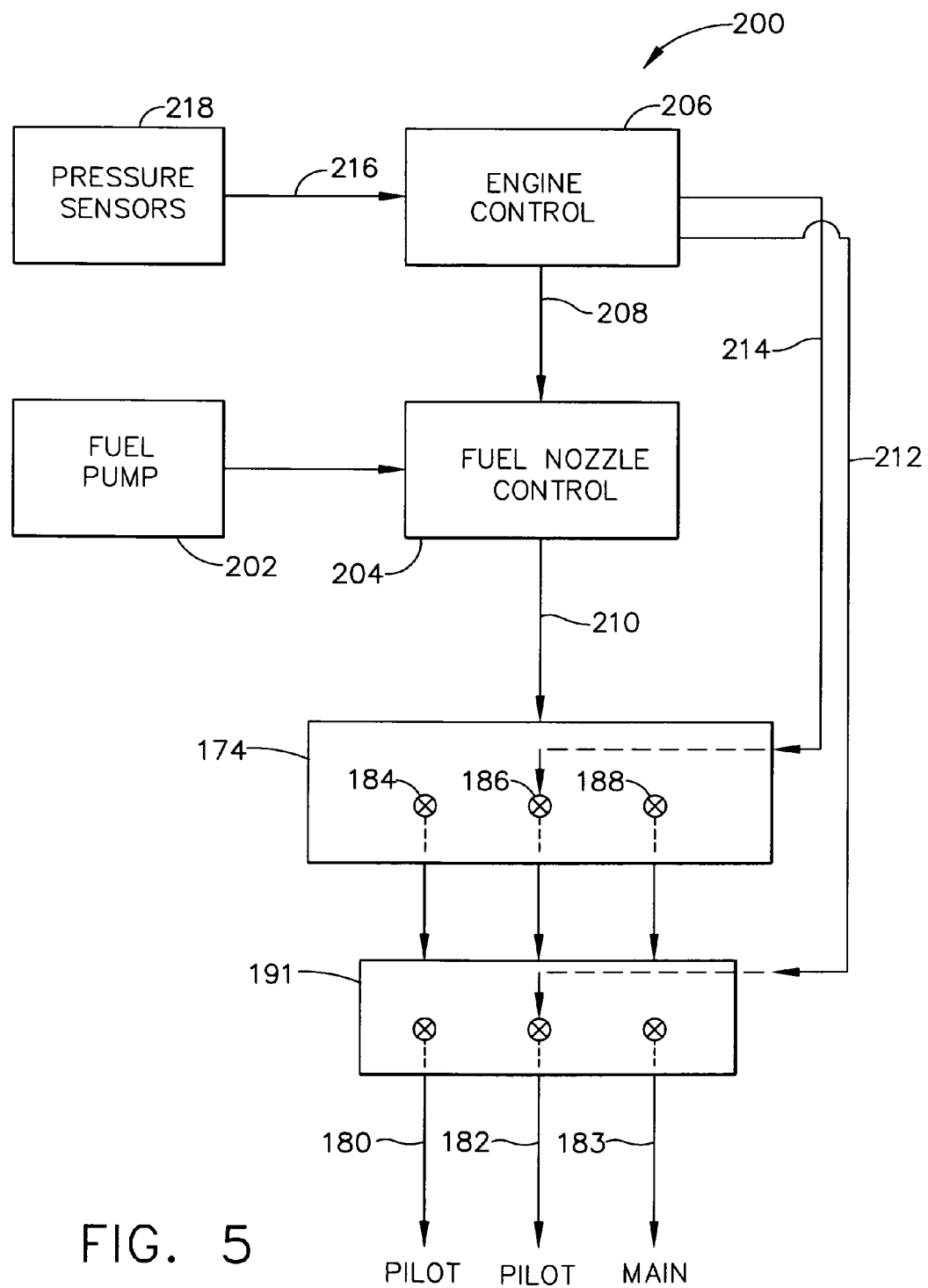
FIG. 5 is a block diagram of a system for providing fuel flow to the mixer assembly depicted in FIGS. 2 and 3.

In order to better understand the manner in which fuel is supplied to mixer assembly 100, a block diagram of an overall fuel flow control system 200 is depicted in FIG. 5. As seen therein, system 200 includes a fuel pump 202, whereby a fuel supply (not shown) in flow communication therewith provides fuel to each fuel nozzle 68 positioned around annular combustor 26. A fuel nozzle control 204 is provided for each fuel nozzle 68 in order to generally control the valves within housing 174 and therefore the amount of fuel provided by circuits 180, 182 and 183. Fuel nozzle control 204 interfaces with fuel pump 202 and receives signals 208 from a full authority digital engine control (FADEC) 206 to coordinate the proper fueling mode of pilot and main mixers 102 and 104 depending upon the current stage of operational cycle for gas turbine engine 10. This will be explained in more detail herein with respect to FIG. 8.

It will be appreciated that staging valves 184, 186 and 188, which are associated with circuits 180, 182 and 183, respectively, are activated according to a signal 210 provided by fuel nozzle control 204. Fuel is then permitted to flow through first circuit 180, second circuit 182, and third circuit 183 within feed strip 178 of each fuel nozzle 68 according to the positioning of staging valves 184, 186 and 188. In this way, fuel is either provided in the desired amount to primary fuel injector 110 of pilot mixer 102, secondary fuel injection ports 134 of pilot mixer 102, and fuel injection ports 128 of main mixer 104 of each mixer assembly 100.

Figure 6:
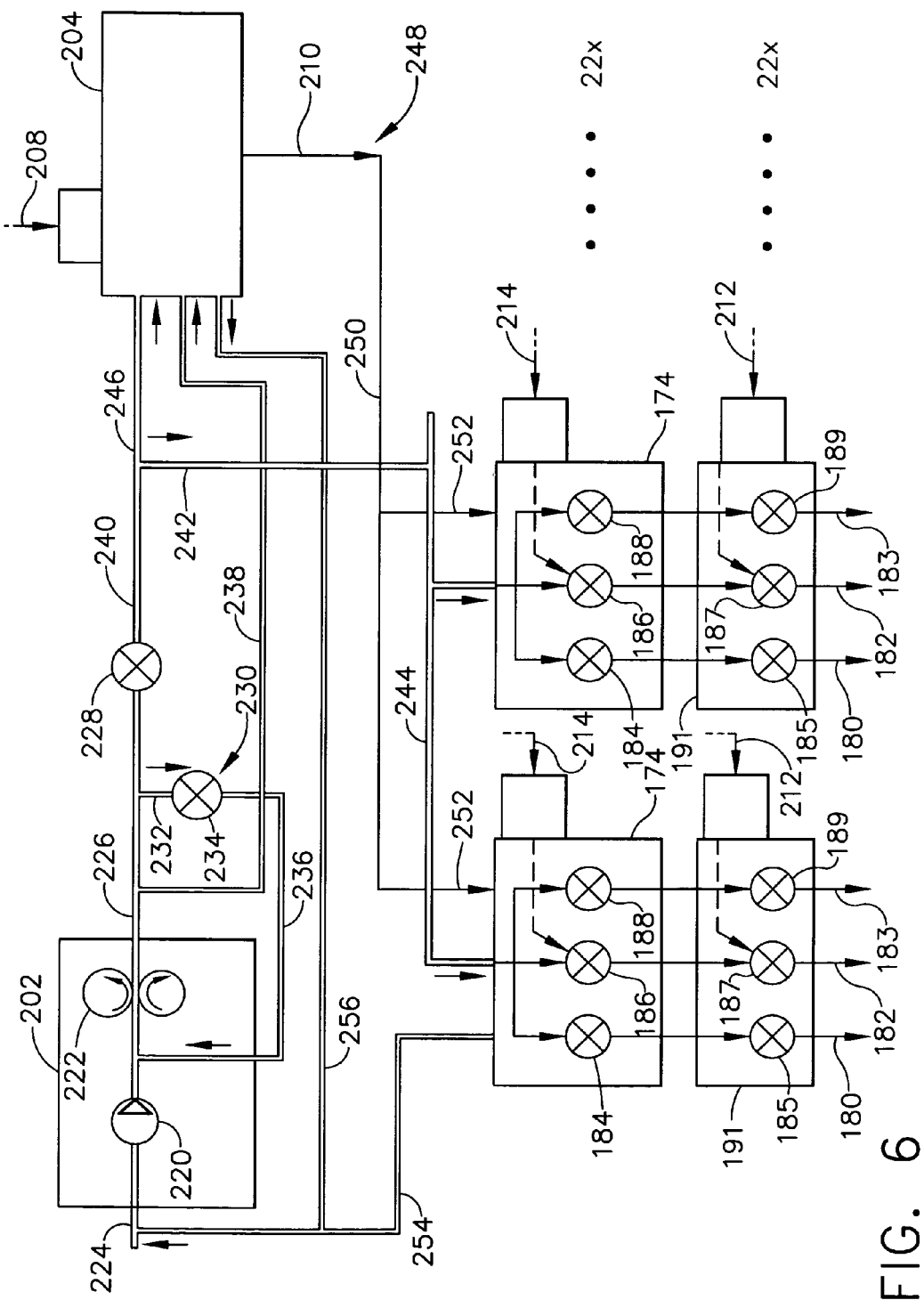
FIG. 6 is a schematic diagram of a system for actively controlling fuel flow through the fuel nozzle assembly depicted in FIG. 4.

In order to pulse the fuel in first, second, and/or third circuits 180, 182 and 183, a second separate control signal 212 from engine control 206 is provided to a pulsing valve 185, a pulsing valve 187 and/or a pulsing valve 189, respectively, of each fuel nozzle 68. It will be noted that pulsing valves 185, 187 and 189 are located within a pulsing valve housing 191 (see FIG. 4). Among other various readings, signals and measurements received by engine control 206, a signal 216 is also provided thereto by at least one pressure sensor 218 located adjacent to outer liner 76 of combustor 26 (see FIG. 2). Pressure sensor 218 senses a frequency and an amplitude for the pressure within combustion chamber 62 and imparts this information to engine control 206 via signal 216. Pressure sensor 218 is capable of withstanding high temperatures experienced in combustion chamber 62. Accordingly, an exemplary pressure sensor is a diaphragm type of transducer, where the displace of the diaphragm is proportional to the dynamic component of the input pressure signal. While only one pressure sensor 218 is depicted in FIGS. 2 and 5, it is preferred that a plurality of pressures sensors 218 be equally spaced circumferentially around outer liner 76 in order to detect dynamic pressure of combustion chamber 62 in a more localized region. Accordingly, only those mixer assemblies located adjacent a region of combustion chamber 62 experiencing dynamic instability are modulated More specifically, FIG. 6 depicts a schematic diagram indicating the flow of fuel from fuel pump 202 to circuits 180, 182 and 183. It will be seen that fuel pump 202, which includes both a booster pump 220 and a main pump 222, receives fuel from an inlet 224. Fuel pump 202 sends fuel through a line 226 to a metering valve 228, where the pressure is controlled In order to maintain a desired pressure for the fuel entering main pump 222, a bypass circuit 230 is in flow communication with line 226. Bypass circuit 230 includes a bypass line 232 with a bypass valve 234 therein for controlling flow back to main pump 222 via a bypass input line 236. It will also be noted that fuel nozzle control 204 taps into line 226 upstream of metering valve 228 via line 238 so that it receives a high pressure source to modulate.

Upon exiting metering valve 228, line 240 splits first into a fuel supply line 242 that provides fuel to a fuel supply manifold 244, which in turn supplies fuel to valve housing 174 of each fuel nozzle 68. A line 246 also in flow communication with line 240 is connected to fuel nozzle control 202, which enables it to determine a differential pressure control of the pressure control nozzle (DPCPFN) and a torque motor current of the pressure control nozzle (TMCPFN). From this information, a fuel signal circuit 248 from fuel nozzle control 202 controls the activation of staging valves 184, 186 and 188. More specifically, fuel signal circuit 248 includes signal 210, also understood herein to be a pressure control pressure off the fuel nozzle (PCPFN), to a fuel signal manifold 250, whereupon fuel signal manifold 250 then provides a signal 252 to each valve housing 174. It will be appreciated that staging valves 184, 186 and 188 will generally be activated according to signal 252 so that the desired amount of fuel provided via fuel supply manifold 244 is passed to the respective circuit of pilot mixer 102 (i.e., first and second circuit 180 and 182) and main mixer 104 (i.e., third circuit 183).

A signal fuel return line 254 extends from each valve housing 174 so as to be in flow communication with fuel pump inlet 224. A sink line 256 from fuel nozzle control also connects to signal fuel return line 254.

It will be further seen in FIG. 6 that fuel nozzle control 202 receives signal 208 from engine control 206. Under certain specified conditions, signal 208 instructs fuel nozzle control 202 to alter the distribution of fuel to circuits 180, 182 and 183 by activating staging valves 184, 186 and 188 in a different manner. This occurs when the amplitude of a dynamic pressure instability is detected in combustion chamber 62 above a predetermined level by one or more pressure sensors 218.

While this predetermined pressure amplitude level may vary or be conditioned upon other engine factors, it generally will be set at a level where integrity of the combustor hardware is maintained (e.g., approximately 0.5 psi peak to peak).

Besides altering the fuel split between circuits 180, 182, and 183, engine control 206 may respond to such pressure instability by causing fuel to be pulsed through one or more of pulsing valves 185, 187 and/or 189. Pulsing of fuel through secondary fuel injection ports 134 of pilot mixer 102 in at least one mixing assembly 100 located near the occurrence of the dynamic pressure instability, via pulsing valve 187, is typically preferred. It has been found that pulsing the fuel with an amplitude and frequency opposite that of the pressure dynamic reduces the pressure instability in that location of combustion chamber 62. Alternatively, pulsing of the fuel may be done at an amplitude and frequency which is a subharmonic of the dynamic pressure on the combustion chamber. Pulsing fuel in this way would be at a lower bandwidth, which would reduce the stress on pulsing valve 187 and increase the life thereof. By utilizing a closed loop system of detecting pressure instabilities and then offsetting them through the pulsing of fuel in this way, the problem is attacked continuously until the dynamic pressure instability is below the predetermined level. Although fuel could alternatively be pulsed through primary fuel injector 110 of pilot mixer 102 via and/or fuel injection ports 128 of main mixer 104 to offset dynamic pressure instabilities in combustion chamber 62, such as the case when pilot mixer 102 does not include secondary fuel injection ports 134, it will be appreciated that pulsing fuel flow to secondary injection ports 134 has a minimal effect on the fuel/air mixture within mixing assembly 100.

It has also been found that a frequency signal from pressure sensors 218 within a specified range is indicative of an incipient lean blowout condition for combustor 26. This signal range is approximately 40 Hertz to approximately 50 Hertz and is able to predict the oncoming condition as opposed to merely detecting it. Accordingly, an override signal 214 is preferably provided by engine control 206 to valve housing 174 so that additional fuel can be supplied to mixer assembly 100. Preferably, override signal 214 involves the activation of valve 186, whereby additional fuel is injected into pilot mixer 102 by means of secondary fuel injection ports 134. The fuel split between pilot mixer 102 and main mixer 104 may also be altered by increasing the amount of fuel provided to primary fuel injector 110 (e.g., when pilot mixer 102 does not include secondary fuel injection ports 134).

Thus, it will be appreciated that modifying the fuel split between pilot mixer 102 and main mixer 104, and even between primary fuel injector 110 and secondary fuel injection ports 134, effectively counters the dynamic pressure instabilities in combustion chamber 62 and an incipient lean blow out condition for combustor 26. Likewise, pulsing fuel in pry fuel injector 110, secondary fuel injection ports 134, and/or fuel injection ports 128 is effective for the same purposes.

It will also be understood that control system 200 is also effective for controlling the pressure dynamics in combustor 26 when actions therein are initiated intentionally. For example, it may be desirable in certain instances (e.g., to improve the mixing of fuel and air during fuel rich conditions) to pulse the fuel provided to mixer 100. Such pulsing of fuel in and of itself may create pressure dynamics which need to be maintained within acceptable limits. Detection and control of such pressure dynamics by means of pressure sensors 218 and engine control 206 may cause the pulsing of fuel to be modified accordingly.

Figure 7:
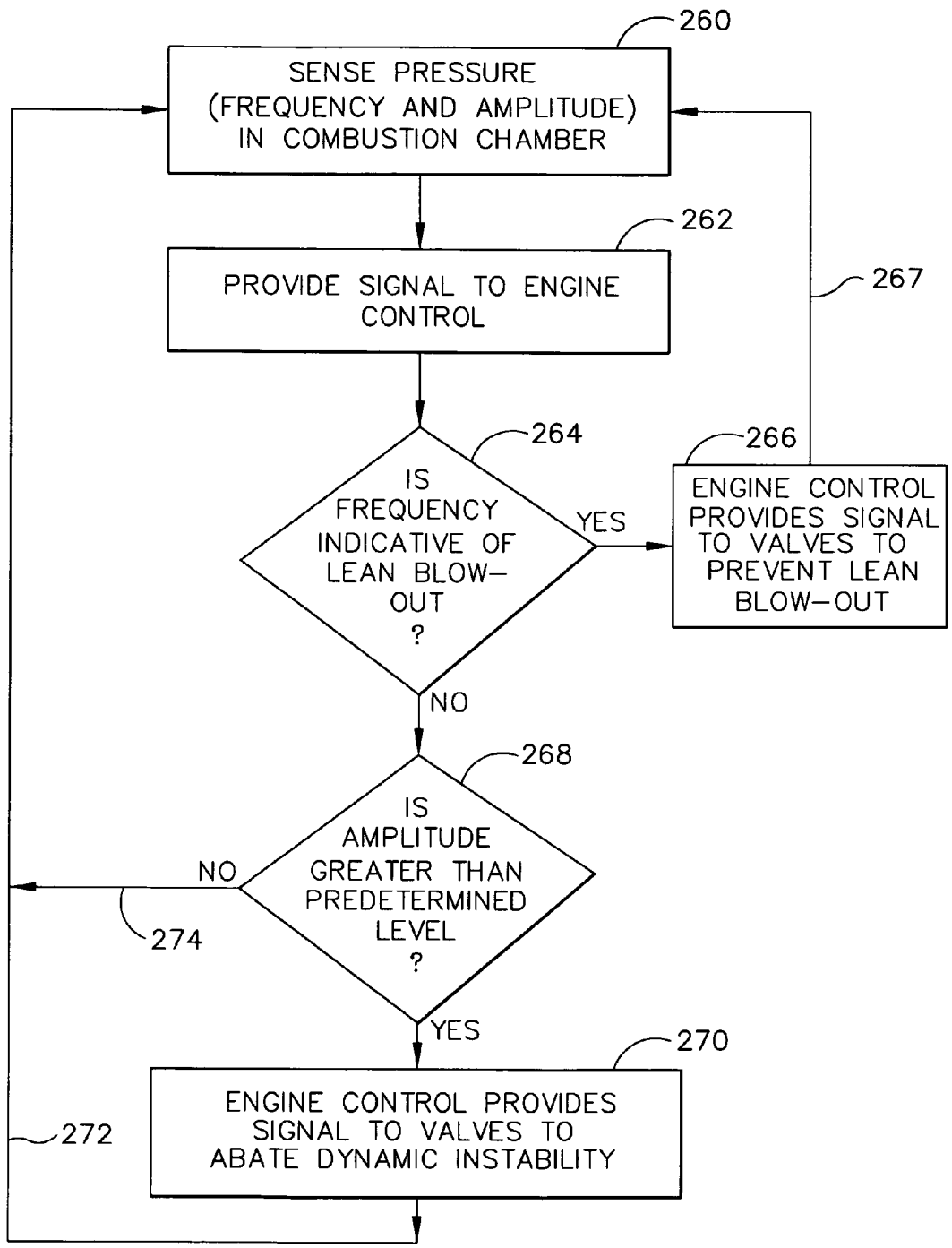
FIG. 7 is a flow diagram depicting operational steps involved in a process for actively controlling fuel flow through the fuel nozzle assembly depicted in FIG. 4 to the mixer assembly depicted in FIGS. 2 and 3; and, FIG. 8 is a diagrammatic view of how fuel flow is provided to the mixer assembly depicted in FIGS. 2 and 3 during specified stages of engine operation.

In conjunction with the physical embodiments of mixer assembly 100 and fuel flow control system 200, it will be understood from the flow diagram in FIG. 7 that a method of actively controlling fuel flow to mixer assembly 100 is also presented. More specifically, such method includes the following steps: sensing dynamic pressure (frequency and amplitude) in combustion chamber 62 of combustor 26 via pressure sensors 218 (box 260); providing signal 216 containing frequency and amplitude information of such pressure to engine control 206 (box 262); and, determining whether the frequency component of signal 216 is within a specified range indicative of incipient lean blow out (comparator box 264). If the frequency component of the pressure signal 216 is within such specified frequency range, then engine control 206 provides signal 214 to valve housing 174 to override the current status of staging valves 184, 186 and 188 to inject additional fuel into pilot mixer 102 (box 266). Afterward, the dynamic pressure in combustion chamber 62 continues to be sensed as represented by a feedback loop 267 to box 260.

Should the frequency component of signal 216 not be within the specified frequency range, then the next step in the process is determining whether an amplitude component of signal 216 is greater than the predetermined level indicative of a dynamic instability (comparator box 268). If this is found to be so, then engine control 206 provides signal 212 to activate pulsing valve 187 (and/or pulsing valves 185 and 189) and thereby modulate pilot flow at a frequency and amplitude which abates the dynamic instability (box 270). Thereafter, the dynamic pressure in combustion chamber 62 continues to be sensed as represented by a feedback loop 272. Should the amplitude component of signal 216 be less than the predetermine level, the system likewise returns to sensing the dynamic pressure in combustion chamber 62 as shown by feedback 274 connecting to feedback loop 272.

Figure 8:
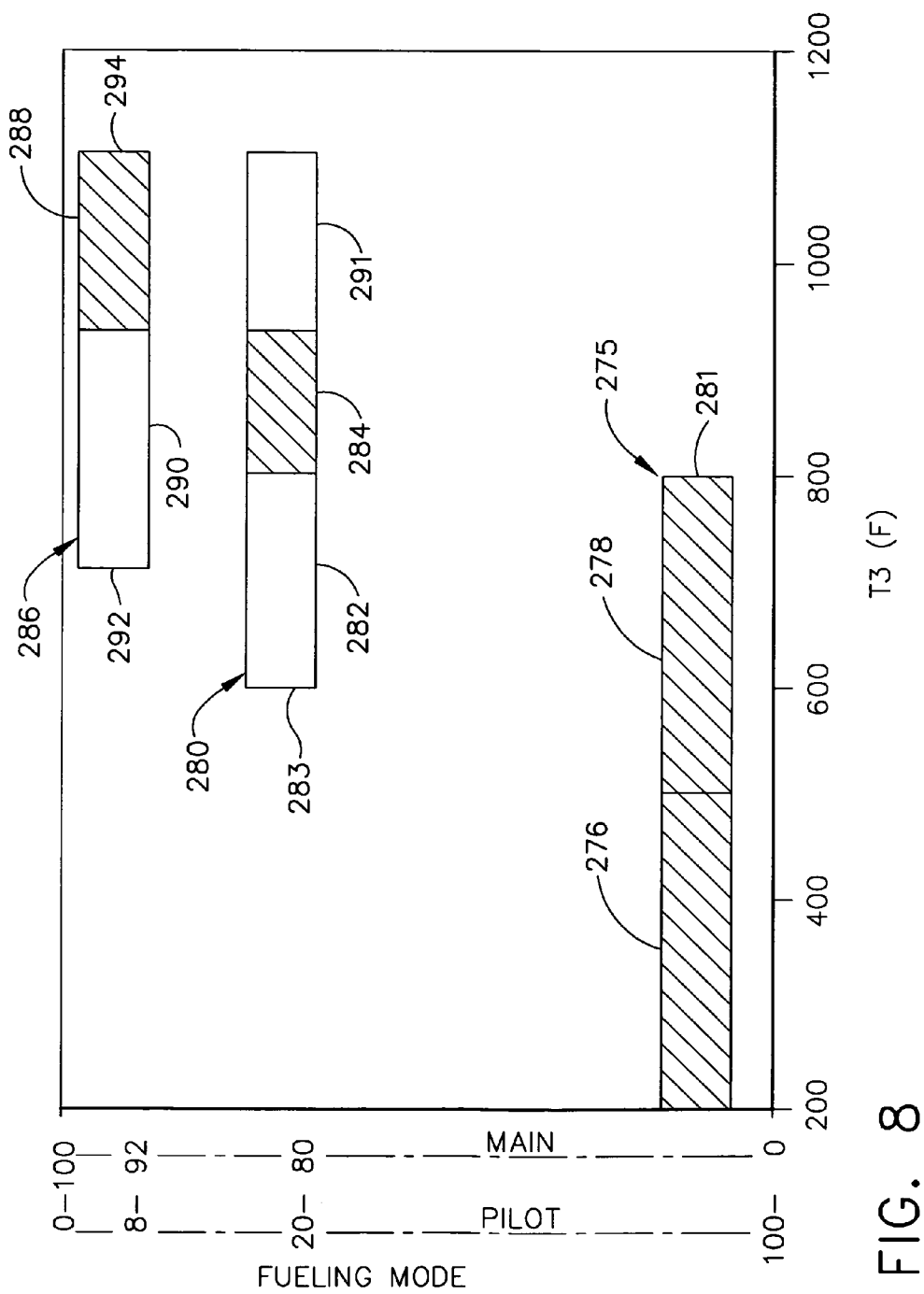

FIG. 8 further illustrates a staging diagram for mixer assembly 100, whereby the relative amount of fuel provided to pilot mixer 102 and main mixer 104 is provided for various points in the cycle of engine 10 (i.e., to obtain certain temperature ranges for combustor 26). Because pilot mixer 102 includes both primary fuel injector 110 and secondary fuel injection ports 134, it has been found that engine 10 is able to operate at an extended temperature range when only providing fuel thereto. This also enables fuel nozzle control 204 to eliminate a separate fueling mode (i.e., 60% pilot mixer/40% main mixer) which has been utilized previously. As seen in a bar 275 in FIG. 8, the first fueling mode involves 100% of the fuel being provided to pilot mixer 102 to obtain a combustor temperature range of approximately 200° F. to about 800° F. Bar 275 further depicts that a first cross-hatched portion 276 thereof is attributed to fuel being provided only to primary fuel injector 110 (i.e., to obtain a combustor temperature range of approximately 200° F. to approximately 500° F.) and a second cross-hatched portion 278 represents fuel being provided to both primary fuel injector 110 and secondary fuel injection ports 134 (to obtain a combustor temperature range of approximately 500° F. to approximately 800° F.). This first stage is considered to be the range of normal operation for optimum performance of combustor 26 when pilot mixer 102 only is fueled. Thus, this first fueling mode is typically used for idle, taxi and approach portions of engine operation.

It has been found that a fuel pump limit 281 for the first fueling mode is reached at approximately 800° F. Accordingly, a second fueling mode involving some distribution of fuel between pilot mixer 102 and main mixer 104 is required. As indicated by bar 280, the preferred fueling mode for achieving combustor temperatures at approximately 800° F. is for about 20% of the fuel to be provided to pilot mixer 102 and about 80% of the fuel to be provided to main mixer 104. Utilization of this fueling mode prior to this temperature point (as represented by blank portion 282 of bar 280) is possible without adverse outcome, but not considered to provide optimum performance of combustor 26. It will also be seen that a lean blow out limit 283 for this fueling mode is at a combustor temperature of approximately 525° F. The second fueling mode is used during a combustor temperature range of approximately 800° F. to approximately 950° F., which is depicted by cross-hatched portion 284 of bar 280. This second fueling mode is then utilized during the climb and cruise portions of engine operation.

It is then seen from bar 286 that a third fueling mode is preferred when the temperature of the combustor inlet air reaches approximately 950° F. It is preferred that the third fueling mode preferably include approximately 8% of the fuel being provided to pilot mixer 102 and approximately 92% of the fuel being provided to main mixer 104. This third temperature stage is represented by cross-hatched portion 288 of bar 286 and involves a combustor temperature range of approximately 950° F. to approximately 1100° F. Utilization of this third fueling mode prior to this temperature point is possible without adverse outcome (see blank portion 290 of bar 286), but not considered to provide optimum performance of combustor 26. It will be noted, however, that a lean blow out limit 292 does exist at approximately 700° F. It will also be seen that the second fueling mode (i.e., 20% pilot mixer/80% main mixer) could be utilized during this combustor temperature range (approximately 950° F. to approximately 1100° F.) without adverse outcome (see blank portion 291 of bar 280), but it has not been found to provide optimum performance of combustor 26. Implementation of the third fueling mode is typically done when the greatest thrust is required from engine 10, such as during the take-off portion of operation. It will then be seen that a fuel pump limit 294 is reached for the third fueling mode (i.e., 8% pilot mixer/92% main mixer) at approximately 1100° F.

Although particular embodiments of the present invention have been illustrated and described, it will be apparent to those skilled in the art that various changes and modifications can be made without departing from the spirit of the present invention. For example, it will be understood that the method and apparatus of the present invention may be utilized with mixers having different configurations. While the mixer shown herein has a pilot mixer with both a primary fuel injector and secondary fuel injection ports, it may also be one where only the primary fuel injector is provided. Accordingly, it is intended to encompass within the appended claims all such changes and modification that fall within the scope of the present invention.

What is claimed is:

1. An apparatus for actively controlling fuel flow from a fuel pump to a mixer assembly of a gas turbine engine combustor, said mixer assembly including a pilot mixer and a main mixer, wherein said pilot mixer further includes an annular pilot housing having a hollow interior, a primary fuel injector mounted in said pilot housing and adapted for dispensing droplets of fuel to said hollow interior of said pilot housing, and a plurality of axial swirlers positioned upstream from said primary fuel injector, said fuel flow control apparatus comprising:
    (a) at least one sensor for detecting dynamic pressure in a combustion chamber of said combustor;
    (b) a fuel nozzle including:
        (1) a feed strip with a plurality of circuits wherein the feed strip comprises a first circuit for supplying fuel to a fuel tube that is in flow communication with said primary fuel injector, a second circuit for supplying fuel to a first fuel manifold that is in flow communication with said pilot mixer, and a third circuit for supplying fuel to a second fuel manifold that is in flow communication with said main mixer; and
        (2) a plurality of valves associated with said fuel nozzle and in flow communication with said feed strip thereof; and,
    (c) a system for actively controlling fuel flow supplied to said pilot mixer and said main mixer of said mixer assembly by said fuel nozzle, wherein said control system activates said valves in accordance with signals received from said pressure sensor.

2. The apparatus of claim 1, further comprising a plurality of pressure sensors spaced circumferentially around said combustion chamber.

3. The apparatus of claim 1, wherein said control system activates said valves to increase fuel flow to said pilot mixer.

4. The apparatus of claim 1, wherein said control system activates said valves so that fuel is pulsed through said primary fuel injector of said pilot mixer.

5. The apparatus of claim 1, wherein a signal from said pressure sensor is indicative of incipient lean blow out in said combustion chamber.

6. The apparatus of claim 5, wherein said signal from said pressure sensor has a frequency within a specified range.

7. The apparatus of claim 6, wherein said specified frequency range is approximately 40 Hertz to approximately 50 Hertz.

8. The apparatus of claim 1, wherein a signal from said pressure sensor is indicative of an unacceptable level of dynamic pressure instability in said combustion chamber.

9. The apparatus of claim 8, wherein said signal from said pressure sensor has an amplitude greater than a specified level.

10. The apparatus of claim 9, wherein said signal from said pressure sensor has an amplitude of at least approximately 0.5 psi peak to peak.

11. The apparatus of claim 4, wherein fuel is pulsed to said primary fuel injector in a manner opposite of any pressure instabilities experienced by said combustion chamber.

12. The apparatus of claim 4, wherein fuel is pulse to said primary fuel injector in a manner which is a subharmonic of any pressure instabilities experienced by said combustion chamber.

13. The apparatus of claim 1, said pilot mixer further comprising a plurality of secondary fuel injection ports for introducing fuel into said hollow interior of said pilot housing and said feed strip including a circuit for providing fuel to the first fuel manifold that is in flow communication with said secondary fuel injection ports of said pilot mixer.

14. The apparatus of claim 13, wherein said control system activates said valves to increase fuel flow to said secondary fuel injection ports of said pilot mixer.

15. The apparatus of claim 13, wherein said control system activates said valves to increase fuel flow to said primary injector of said pilot mixer.

16. The apparatus of claim 13, wherein said control system activates said valves so that fuel is pulsed through said primary injector of said pilot mixer.

17. The apparatus of claim 13, wherein said control system activates said valves so that fuel is pulsed through said secondary fuel injection ports of said pilot mixer.

18. The apparatus of claim 14, wherein a signal from said pressure sensor is indicative of incipient lean blow out in said combustion chamber.

19. The apparatus of claim 18, wherein said signal from said pressure sensor has a frequency within a specified range.

20. The apparatus of claim 19, wherein said specified frequency range is approximately 40 Hertz to approximately 50 Hertz.

21. The apparatus of claim 14, wherein a signal from said pressure sensor is indicative of an unacceptable level of dynamic pressure instability in said combustion chamber.

22. The apparatus of claim 21, wherein said signal from said pressure sensor has an amplitude greater than a specified level.

23. The apparatus of claim 22, wherein said signal from said pressure sensor has an amplitude of at least approximately 0.5 psi peak to peak.

24. The apparatus of claim 17, wherein fuel is pulsed to said secondary fuel injection ports in a manner opposite of any pressure instabilities experienced by said combustion chamber.

25. The apparatus of claim 17, wherein fuel is pulsed to said secondary fuel injection ports in a manner which is a subharmonic of any pressure instabilities experienced by said combustion chamber.

26. The apparatus of claim 14, wherein said control system activates said valves so that a predetermined amount of fuel flows to said primary fuel injector and said secondary fuel injection ports.

27. The apparatus of claim 1, wherein said control system activates said valves so that a predetermined amount of fuel flows through said fuel nozzle to said pilot mixer and said main mixer during specified fueling modes of said combustor.

28. The apparatus of claim 27, wherein said control system activates said valves so that fuel flowing through said fuel nozzle is supplied only to said pilot mixer during a first fueling mode for said combustor.

29. The apparatus of claim 28, wherein said control system activates said valves so that approximately 20% of fuel flowing through said fuel nozzle is supplied to said pilot mixer and approximately 80% is supplied to said main mixer during a second fueling mode for said combustor.

30. The apparatus of claim 29, wherein said control system activates said valves so that approximately 8% of fuel flowing through said fuel nozzle is supplied to said pilot mixer and approximately 92% is supplied to said main mixer during a third fueling mode of said combustor.

31. The apparatus of claim 27, wherein a lower limit for said fueling modes of said combustor is defined by when lean blow out occurs.

32. The apparatus of claim 27, wherein an upper limit for said fueling modes of said combustor is defined by a fuel pump limit associated with said fuel nozzle.

33. The apparatus of claim of claim 27, wherein a lower limit for said fueling modes of said combustor is defined by an efficiency limit.

34. The apparatus of claim 1, wherein fuel is supplied to said pilot mixer and said main mixer by said fuel nozzle to obtain specified temperature ranges of said combustor.

35. The apparatus of claim 1, wherein fuel is supplied from said fuel nozzle to said pilot mixer of only specified mixer assemblies of said combustor to offset localized pressure instabilities experienced by said combustion chamber.

* * * * *